United States Patent
Jeong (10) Patent No.: US 9,547,132 B2
(45) Date of Patent: Jan. 17, 2017

(54) OPTICAL ELEMENT, LIGHT TRANSMITTING DEVICE, AND LIGHT RECEIVING DEVICE

(71) Applicants: FUJITSU LIMITED, Kawasaki-shi, Kanagawa (JP); Photonics Electronics Technology Research Association, Bunkyo-ku, Tokyo (JP)

(72) Inventor: Seokhwan Jeong, Sagamihara (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 91 days.

(21) Appl. No.: 14/730,706

(22) Filed: Jun. 4, 2015

(65) Prior Publication Data

US 2016/0006533 A1 Jan. 7, 2016

(30) Foreign Application Priority Data

Jul. 3, 2014 (JP) ................. 2014-137875

(51) Int. Cl.
*G02F 1/035* (2006.01)
*G02B 6/26* (2006.01)
(Continued)

(52) U.S. Cl.
CPC ......... *G02B 6/29355* (2013.01); *G02B 6/2938* (2013.01)

(58) Field of Classification Search
CPC .......................... G02B 6/29355; G02B 6/2938
(Continued)

(56) References Cited

U.S. PATENT DOCUMENTS

2003/0202743 A1* 10/2003 Shibata .............. G02B 6/29353
385/27

FOREIGN PATENT DOCUMENTS

| JP | 2013-186358 A1 | 9/2013 | |
|----|----------------|--------|----|
| JP | 2013-205626 A1 | 10/2013 | |
| JP | 2013205626 A * | 10/2013 | ............... G02B 6/12 |

OTHER PUBLICATIONS

D.W. Kim, et al.; "Silicon-on-insulator eight-channel optical multiplexer based on a cascade of asymmetric Mach-Zehnder interferometers;" Optics Letters; vol. 33; No. 5; Mar. 1, 2008; pp. 530-532 (3 Sheets)/p. 2 of specification.
(Continued)

*Primary Examiner* — Jerry Blevins
(74) *Attorney, Agent, or Firm* — Kratz, Quintos & Hanson, LLP (57) ABSTRACT

An optical element includes: a first delayed interferometer; and a second delayed interferometer and a third delayed interferometer cascaded to the first delayed interferometer. The first delayed interferometer includes: a first optical coupler and a second optical coupler; a first waveguide between the first optical coupler and the second optical coupler; a second waveguide between the first optical coupler and the second optical coupler, the second waveguide being longer than the first waveguide; and a ring waveguide that is coupled to the first waveguide. A difference between a length of the first waveguide and a length of the second waveguide differs from a difference in lengths corresponding to a channel spacing by a length corresponding to a phase displacement caused by loading of the ring waveguide.

7 Claims, 8 Drawing Sheets

(51) Int. Cl.
  *G02B 6/42* (2006.01)
  *H04J 14/02* (2006.01)
  *G02B 6/293* (2006.01)

(58) Field of Classification Search
  USPC .......................................... 385/3, 24; 398/82
  See application file for complete search history.

(56) References Cited

OTHER PUBLICATIONS

F. Horst; "Silicon Integrated Waveguide Devices for Filtering and Wavelength Demultiplexing;" Proceedings of 2010 Optical Fiber Communication Conference, OWJ3 (3 Sheets)/p. 2 of specification.
J. Song, et al.; "Passive ring-assisted Mach-Zehnder interleaver on silicon-on-insulator;" Optics Express; vol. 16; No. 12; Jun. 9, 2008; pp. 8359-8365 (7 Sheets)/p. 3 of specification.
S.-H. Jeong, et al.; Flat-topped and low loss silicon-nanowire-type optical MUX/DeMUX employing multi-stage microring resonator assisted delayed Mach-Zehnder interferometers; Optics Express; vol. 20; No. 23; Nov. 5, 2012; pp. 26000-26011 (12 Sheets)/p. 3 of specification.

* cited by examiner

OPTICAL ELEMENT, LIGHT TRANSMITTING DEVICE, AND LIGHT RECEIVING DEVICE

CROSS-REFERENCE TO RELATED APPLICATION

This application is based upon and claims the benefit of priority of the prior Japanese Patent Application No. 2014-137875, filed on Jul. 3, 2014, the entire contents of which are incorporated herein by reference.

FIELD

The embodiments discussed herein are directed to an optical element, a light transmitting device, and a light receiving device.

BACKGROUND

An optical element such as a wavelength multi/demultiplexing element is used for optical communication and optical interconnection. Silicon (Si) photonics has been recently drawing attention as a promising technology for large-capacity interconnection, and an improvement of transmission capacity per one photonic wire by wavelength division multiplexing (WDM) in a Si chip is expected. A wavelength multi/demultiplexer of Si photonic wire waveguide type, for example, is used as a multiplexer which multiplexes WDM optical signals, and a demultiplexer which demultiplexes a WDM optical signals for transmission/reception of WDM optical signals in the Si chip. As an example of such a multi/demultiplexer, there is a delayed interferometric element, and various studies regarding delayed interferometric elements have been conducted.

For example, it is reported that a flatness of multi/demultiplexed spectrum is improved by loading a ring waveguide coupled to a waveguide between a pair of optical couplers. However, even if the ring waveguide is used, it is difficult for a conventional delayed interferometric element to obtain a sufficient flatness without conducting a temperature control.

Patent Literature 1: Japanese Laid-Open Patent Publication No. 2013-186358

Patent Literature 2: Japanese Laid-Open Patent Publication No. 2013-205626

Non-Patent Literature 1: D. W. Kim, A. Barkai, R. Jones, N. Elek, H. Nguyen, and A. Liu, "Silicon-on-insulator eight-channel optical multiplexer based on a cascade of asymmetric Mach-Zehnder interferometers," Optics Letters 33(5), 530-532 (2008)

Non-Patent Literature 2: F. Horst, "Silicon integrated waveguide devices for filtering and wavelength demultiplexing," in Proceedings of 2010 Optical Fiber Communication Conference, OWJ3

Non-Patent Literature 3: J. Song, Q. Fang, S. H. Tao, M. B. Yu, G. Q. Lo, and D. L. Kwong, "Passive ring-assisted Mach-Zehnder interleaver on silicon-on-insulator," Optics Express 16(12), 8359-8365 (2008)

Non-Patent Literature 4: S.-H. Jeong, S. Tanaka, T. Akiyama, S. Sekiguchi, Y. Tanaka, and K. Morito, "Flat-topped and low loss silicon-nanowire-type optical MUX/DeMUX employing multi-stage microring resonator assisted delayed Mach-Zehnder interferometers," Optics Express 20(23), 26000-26011 (2012)

SUMMARY

According to an aspect of the embodiments, an optical element includes: a first delayed interferometer; and a second delayed interferometer and a third delayed interferometer cascaded to the first delayed interferometer. The first delayed interferometer includes: a first optical coupler and a second optical coupler; a first waveguide between the first optical coupler and the second optical coupler; a second waveguide between the first optical coupler and the second optical coupler, the second waveguide being longer than the first waveguide; and a ring waveguide that is coupled to the first waveguide. A difference between a length of the first waveguide and a length of the second waveguide differs from a difference in lengths corresponding to a channel spacing by a length corresponding to a phase displacement caused by loading of the ring waveguide.

According to another aspect of the embodiments, a light transmitting device includes: a light source unit that emits a plurality of lights with different wavelengths; a modulator that modulates the plurality of lights; and the optical element, the optical element multiplexing the plurality of lights.

According to another aspect of the embodiments, a light receiving device includes: the optical element, the optical element demultiplexing an optical signal to a plurality of lights with different wavelengths; and a light receiver that receives the plurality of lights output from the optical element.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The inventor of the present application conducted earnest studies regarding the reason why it is difficult for the conventional delayed interferometric element to obtain a multi/demultiplexed spectrum with high flatness without conducting the temperature control. As a result, it was clarified that a phase displacement accompanied by the loading of the ring waveguide occurs in the conventional delayed interferometric element.

Figure 1:
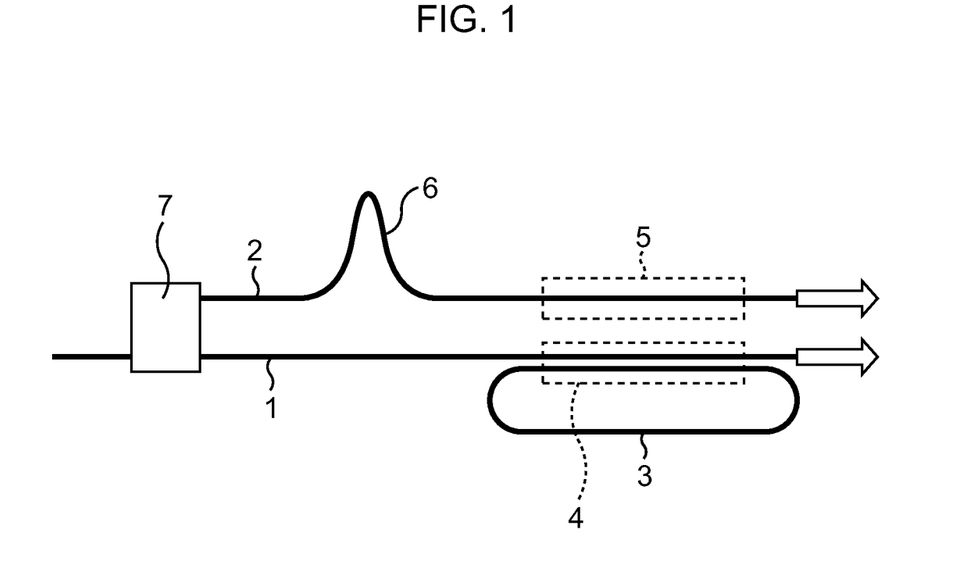
FIG. 1 is a diagram illustrating components of a delayed interferometric element according to a reference example.

FIG. 1 is a diagram illustrating components of a delayed interferometric element according to a reference example. In the delayed interferometric element illustrated in FIG. 1, two waveguides of a waveguide 1 and a waveguide 2 are connected to an optical coupler 7 which splits light, a ring waveguide 3 is coupled to the waveguide 1, and a delayed part 6 is provided to the waveguide 2, in which an optical path length of the waveguide 2 is longer than an optical path length of the waveguide 1 by a length of the delayed part 6, as illustrated in FIG. 1. The difference between the optical path lengths is determined in accordance with a demanded channel spacing. A structure of the ring waveguide 3 is determined in accordance with the channel spacing, the difference between the optical path lengths, and the like. A design is conducted by assuming that an optical signal which propagates through the waveguide 2 is input into an optical coupler while maintaining a phase delay of $\Delta\phi_D$ as it is generated in the optical signal due to the delayed part 6.

However, as a result of earnest studies conducted by the inventor, it was clarified that a difference $\Delta\phi_1$ of an optical signal propagating through the waveguide 1 between a phase in front of a coupling region 4 of the waveguide 1 and the ring waveguide 3 and a phase at a rear of the coupling region 4, does not coincide with a difference $\Delta\phi_2$ of the optical signal propagating through the waveguide 2 between a phase in front of a region 5, corresponding to the coupling region 4, and a phase at a rear of the region 5. Specifically, it was clarified that a phase displacement ($\Delta\phi_1-\Delta\phi_2$) caused by the loading of the ring waveguide 3 is included, other than the phase delay of $\phi_D$ and a phase delay caused by a manufacturing error, between the optical signal propagated through the coupling region 4 and the optical signal propagated through the region 5 corresponding to the coupling region 4. In a sample prepared by the inventor, for example, there was a relation presented in Table 1 among a distance between the waveguide 1 and the ring waveguide 3 in the coupling region 4, a length of the coupling region 4, a radius of curvature of a curved portion of the ring waveguide 3, and a relative phase difference (magnitude of phase displacement). The waveguide in the sample was a Si photonic wire waveguide, and a width of the waveguide was 440 nm.

TABLE 1

| DISTANCE (μm) | LENGTH (μm) | radius of curvature (μm) | relative phase difference (rad) |
|---|---|---|---|
| 0.6 | 15 | 9 | ABOUT 0.03π |
| 0.4 | 15 | 9 | ABOUT 0.14π |
| 0.3 | 15 | 9 | ABOUT 0.31π |
| 0.2 | 15 | 9 | ABOUT 0.79π |

As described above, it was clarified for the first time by the inventor that the phase displacement becomes larger as the distance in the coupling region 4 decreases. It was also clarified for the first time by the inventor that the phase displacement becomes larger as the length of the coupling region 4 increases. It was also clarified for the first time by the inventor that the magnitude of the phase displacement depends on the radius of curvature of the ring waveguide 3 and the widths of the waveguide 1 and the ring waveguide 3. The magnitude of the phase displacement indicates a finite value, and is not a fixed value. Specifically, it was clarified that the ring waveguide 3 exerts an influence on the phase of the optical signal which propagates through the waveguide 1, which has not been focused till now. In the conventional delayed interferometric element, the influence of the phase displacement as above is not taken into consideration, so that even when there is no manufacturing error, it is not possible to obtain a desired characteristic. The magnitude of the phase displacement may be considered based on a difference between an even mode and an odd mode, which are obtained by decomposing a mode distribution of the coupling region 4, and a mode of a delay waveguide.

The inventor further conducted earnest studies based on the above-described new findings, and as a result, it was found out that a flatness of multi/demultiplexed spectrum is improved by providing, to a delayed interferometer including a ring waveguide, a phase shifter that cancels a phase displacement caused by the loading of the ring waveguide.

Hereinafter, embodiments will be concretely described while referring to the attached drawings.

First Embodiment

Figure 2:
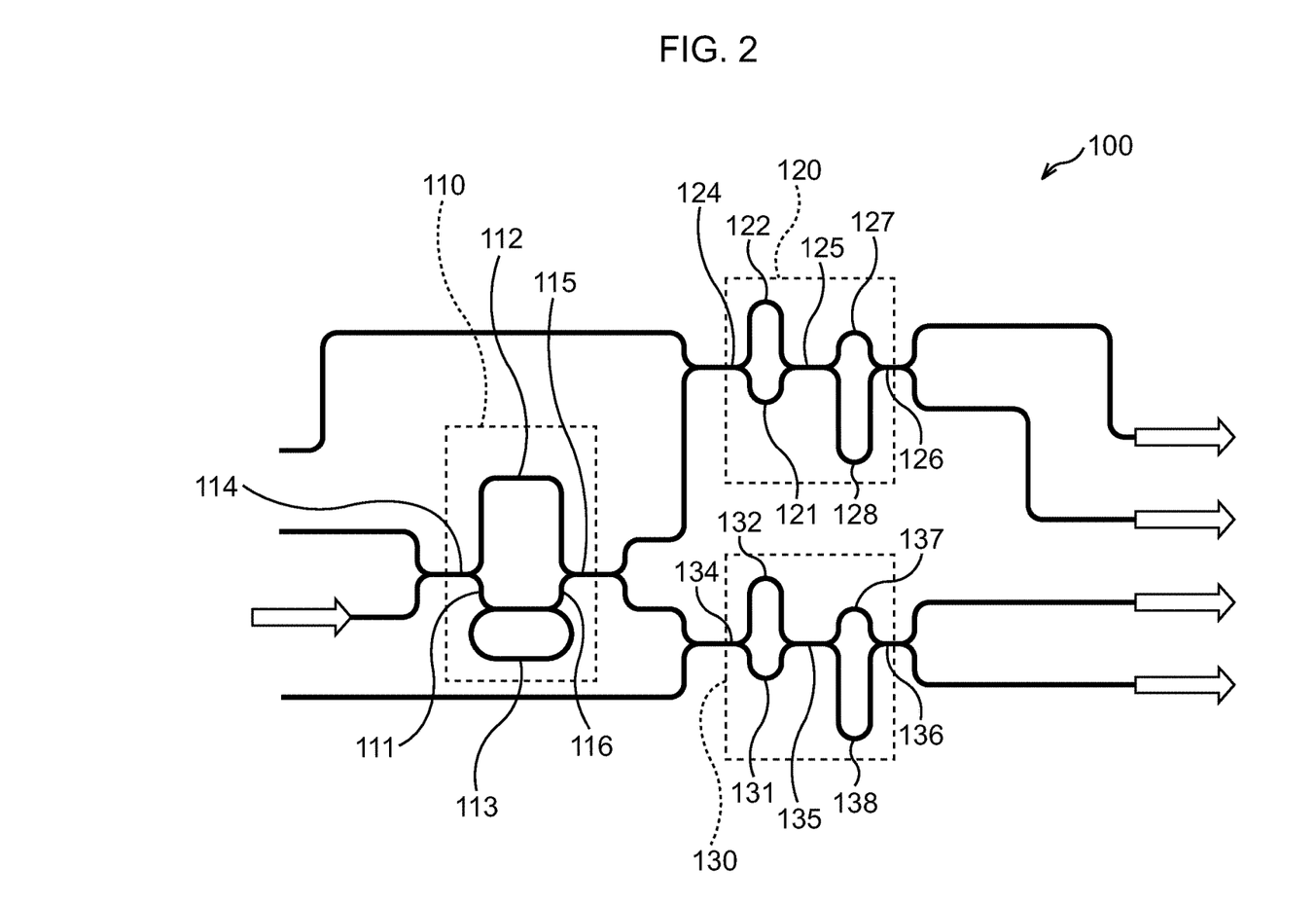
FIG. 2 is a diagram illustrating a structure of an optical element according to a first embodiment.

First, a first embodiment will be described. The first embodiment is an example of a wavelength demultiplexer. FIG. 2 is a diagram illustrating a structure of an optical element according to the first embodiment.

An optical element 100 according to the first embodiment includes a delayed interferometer 110, as illustrated in FIG. 2. The delayed interferometer 110 includes an optical coupler 114 and an optical coupler 115, and a waveguide 111 and a waveguide 112 are connected between the optical coupler 114 and the optical coupler 115. The waveguide 112 is longer than the waveguide 111. The delayed interferometer 110 is further provided with a ring waveguide 113 coupled to the waveguide 111. The waveguide 111 includes a phase shifter 116.

A delayed interferometer 120 and a delayed interferometer 130 are connected to the optical coupler 115. The delayed interferometer 120 includes an optical coupler 124, an optical coupler 125, and an optical coupler 126, a waveguide 121 and a waveguide 122 are connected between the optical coupler 124 and the optical coupler 125, and a waveguide 127 and a waveguide 128 are connected between the optical coupler 125 and the optical coupler 126. The delayed interferometer 130 includes an optical coupler 134, an optical coupler 135, and an optical coupler 136, a waveguide 131 and a waveguide 132 are connected between the optical coupler 134 and the optical coupler 135, and a waveguide 137 and a waveguide 138 are connected between the optical coupler 135 and the optical coupler 136. The waveguide 122 is longer than the waveguide 121 by a difference $\Delta L_2$, and the waveguide 128 is longer than the waveguide 127 by a difference $\Delta L_1$. The difference $\Delta L_1$ is twice the difference $\Delta L_2$. The waveguide 132 is longer than the waveguide 131 by a length obtained by subtracting a length equivalent of $0.5\pi$ radians from the difference $\Delta L_2$, and the waveguide 138 is longer than the waveguide 137 by a length obtained by subtracting a length equivalent of $1.0\pi$ radians from the difference $\Delta L_1$. The waveguide 112 is longer than the waveguide 111 by a length $\Delta L_{Total}$ obtained by subtracting a length $\Delta L_{PS}$ of the phase shifter 116 from the difference $\Delta L_1$ ($\Delta L_{Total}=\Delta L_1-\Delta L_{PS}$).

As described above, each of the delayed interferometer 120 and the delayed interferometer 130 has a structure of delayed Mach-Zehnder interferometer (DMZI), and the delayed interferometer 110 has a structure of delayed Mach-Zehnder interferometer loaded with micro-ring waveguide (M-DMZI).

Each of the optical coupler 114, the optical coupler 115, the optical coupler 124, the optical coupler 125, the optical coupler 126, the optical coupler 134, the optical coupler 135, and the optical coupler 136 is, for example, a directional coupler or a MMI (multimode interference) coupler. A Si photonic wire waveguide having a cross-sectional structure illustrated in FIG. 3A, for example, is used for each of the waveguide 111, the waveguide 112, the ring waveguide 113, the waveguide 121, the waveguide 122, the waveguide 127, the waveguide 128, the waveguide 131, the waveguide 132, the waveguide 137, and the waveguide 138.

Figure 3A:
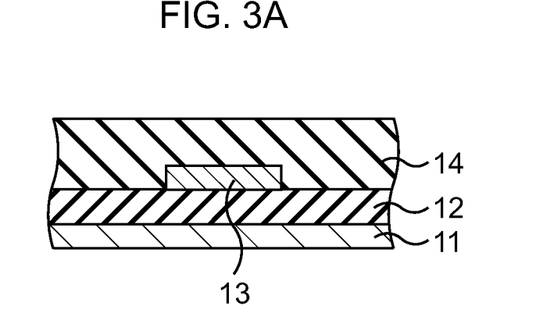
FIG. 3A is a diagram illustrating an example of a sectional structure of a waveguide.

A buried oxide layer 12 of Si oxide, a Si layer 13, and a Si oxide layer 14 are provided on a Si substrate 11 in a channel structure illustrated in FIG. 3A. The Si layer 13 has a 220 nm thickness and a 440 nm width. Such a channel structure may be formed in the following manner, for example. First, a SOI substrate including a Si substrate, a layer of Si oxide, and a Si layer is prepared. Then, a photomask which covers a portion composing a waveguide or an optical coupler is formed by light exposure, electron beam exposure or the like. Thereafter, the Si layer is dry-etched using the photomask to form the Si layer 13 with a predetermined pattern shape. Reactive ion etching is performed, for example, as the dry etching. Subsequently, the Si oxide layer 14 is formed through a vapor deposition method or the like. In the manner as described above, the channel structure including the Si substrate 11, the buried oxide layer 12, the Si layer 13, and the Si oxide layer 14 is obtained. A rib waveguide structure illustrated in FIG. 3B may be adopted. In this case, a Si layer 15 having an about 50 nm slab height is used instead of the Si layer 13.

Next, the difference $\Delta L_1$ and the length of the phase shifter 116 will be described. The difference $\Delta L_1$ is represented by an expression (1).

$$\Delta L_1 = (\lambda_{DMZI} \times m)/N_{Eq} \qquad (1)$$

$\lambda_{DMZI}$, m, and $N_{Eq}$ indicate a center wavelength, a diffraction order, and an effective refractive index of the waveguide 111 and the waveguide 112, respectively, in the delayed interferometric part of the delayed interferometer 110. The delayed interferometric part includes the waveguide 112, and the waveguide 111 excluding a part of the phase shifter 116. A center wavelength $\lambda_{MRR}$ of a micro-ring resonator (MRR) including the ring waveguide 113 and the waveguide 111 is represented by an expression (2). Specifically, in the present embodiment, an antiresonance condition is satisfied. Further, in the present embodiment, an optical coupling ratio $K_{MRR}$ of the micro-ring resonator is about 85%, for example.

$$\lambda_{MRR} = \lambda_{DMZI} - 0.5 \times \Delta v \qquad (2)$$

$\Delta v$ indicates a channel spacing. Therefore, the center wavelength $\lambda_{DMZI}$ can be determined by the channel spacing $\Delta v$ and the center wavelength $\lambda_{MRR}$, and the difference $\Delta L_1$ can be determined by the center wavelength $\lambda_{DMZI}$, the diffraction order m, and the effective refractive index $N_{Eq}$. A value obtained by subtracting the difference $\Delta L_1$ from the length $\Delta L_{Total}$ corresponds to the length $\Delta L_{PS}$.

The channel spacing $\Delta v$ is represented by an expression (3).

$$\Delta v = \lambda_{DMZI}^2/(2 \times N_{Gr} \times \Delta L_1) \qquad (3)$$

Figure 3B:
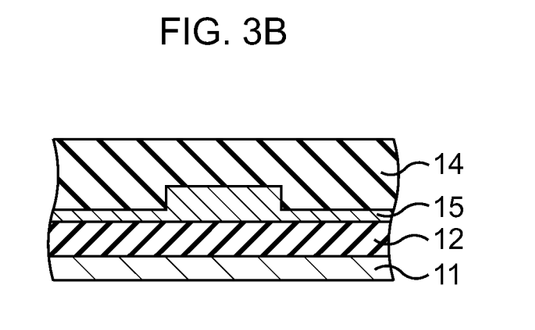
FIG. 3B is a diagram illustrating another example of a sectional structure of a waveguide.

In the present embodiment, for example, the channel spacing $\Delta v$ is 800 GHz, and each of the waveguide 111 and the waveguide 112 has the structure illustrated in FIG. 3A or FIG. 3B. Therefore, the difference $\Delta L_1$ is about 44 μm, and the difference $\Delta L_2$ is about 22 μm. In the present embodiment, a width of each of the waveguide 111, the waveguide 112, and the ring waveguide 113 is 440 nm, a distance between the waveguide 111 and the ring waveguide 113 is 0.2 μm, a length of a coupling region of the waveguide 111 and the ring waveguide 113 is 15 μm, and a length $\Delta L_{PS}$ of the phase shifter 116 is 0.26 μm. If each of the waveguide 111 and the waveguide 112 has the structure illustrated in FIG. 3A or FIG. 3B, the optical path length of 0.26 μm corresponds to a phase difference of 0.79 radians, so that a relative phase difference (magnitude of phase displacement) caused by the loading of the ring waveguide 113 is cancelled, as is apparent from Table 1.

If each of the waveguide 111 and the waveguide 112 has the structure illustrated in FIG. 3A or FIG. 3B, an optical path length corresponding to 0.5π radians and an optical path length corresponding to 1.0π radians are 0.16 μm and 0.32 μm, respectively. Therefore, a difference in optical path lengths of the waveguide 122 and the waveguide 121 is about 22 μm, a difference in optical path lengths of the waveguide 128 and the waveguide 127 is about 44 μm, a difference in optical path lengths of the waveguide 132 and the waveguide 131 is about 21.84 μm, and a difference in optical path lengths of the waveguide 138 and the waveguide 137 is about 43.68 μm.

With the use of the optical element 100 as described above, since the delayed interferometer 110 includes the appropriate phase shifter 116, the phase displacement caused by the loading of the ring waveguide 113 is cancelled. Thus, the phase displacement, which has not been conventionally focused, is eliminated, resulting in that an optical multiplexed spectrum with excellent flatness can be obtained and that an excellent roll-off characteristic of a side band can be achieved while securing a desired channel spacing without performing a complicated control such as a temperature control. A low crosstalk can be obtained while realizing a small size due to the function of the ring waveguide 113.

Figure 4A:
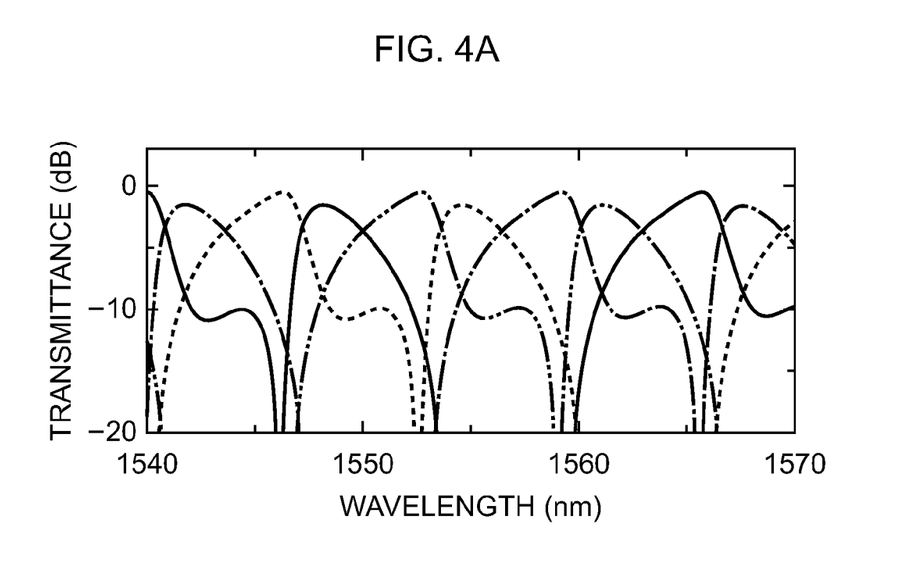
FIG. 4A is a diagram illustrating spectrum characteristics of a reference example.
Figure 4B:
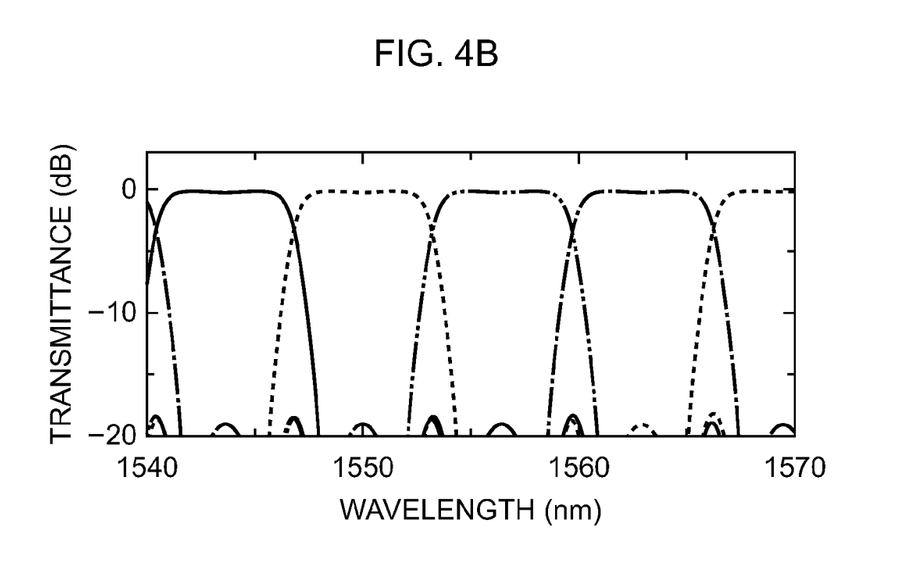
FIG. 4B is a diagram illustrating spectrum characteristics of the first embodiment.

FIG. 4A and FIG. 4B are diagrams illustrating spectrum characteristics of the first embodiment and a reference example. FIG. 4A illustrates the spectrum characteristic of the reference example, and FIG. 4B illustrates the spectrum characteristic of the first embodiment. FIG. 4A and FIG. 4B illustrate results of simulation performed by assuming that the manufacturing error does not occur. The reference example has a structure similar to that of the first embodiment except that the phase shifter 116 is not provided. As illustrated in FIG. 4A, it is difficult, in the reference example, to obtain a good flatness even if no manufacturing error occurs. Accordingly, a complicated control such as a temperature control has been conventionally conducted. On the contrary, according to the first embodiment, it is possible to obtain an optical multiplexed spectrum with excellent flatness, and to obtain an excellent roll-off characteristic of a side band. Each of four types of curves in FIG. 4A and FIG. 4B indicates a transmittance of one channel.

Second Embodiment

Figure 5:
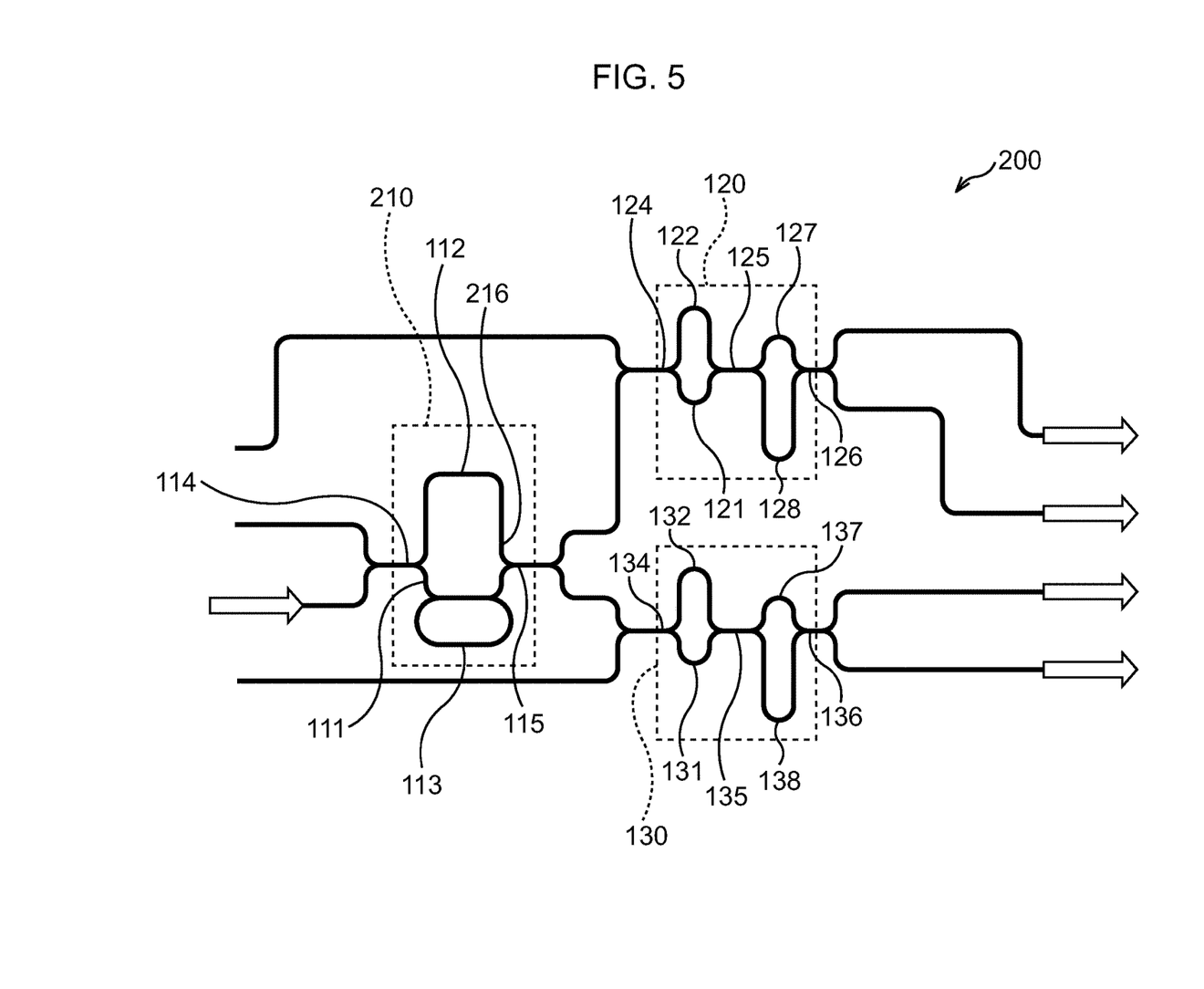
FIG. 5 is a diagram illustrating a structure of an optical element according to a second embodiment.

Next, a second embodiment will be described. The second embodiment is an example of a wavelength demultiplexer. FIG. 5 is a diagram illustrating a structure of an optical element according to the second embodiment.

In the second embodiment, the phase shifter 116 is not provided, and a phase shifter 216 is included in the waveguide 112, while the phase shifter 116 is included in the waveguide 111 in the first embodiment as described above. A length of the phase shifter 216 is −0.26 μm. The other structure is similar to that of the first embodiment.

In the second embodiment, since the phase shifter 216 is provided, a length of the waveguide 112 is shorter than that of the first embodiment by 0.26 μm, and since the phase shifter 116 is not provided, a length of the waveguide 111 is shorter than that of the first embodiment by 0.26 μm. Therefore, similar to the first embodiment, the waveguide 112 is longer than the waveguide 111 by the length $\Delta L_{Total}$. Thus, an effect similar to that of the first embodiment can be obtained.

Third Embodiment

Figure 6:
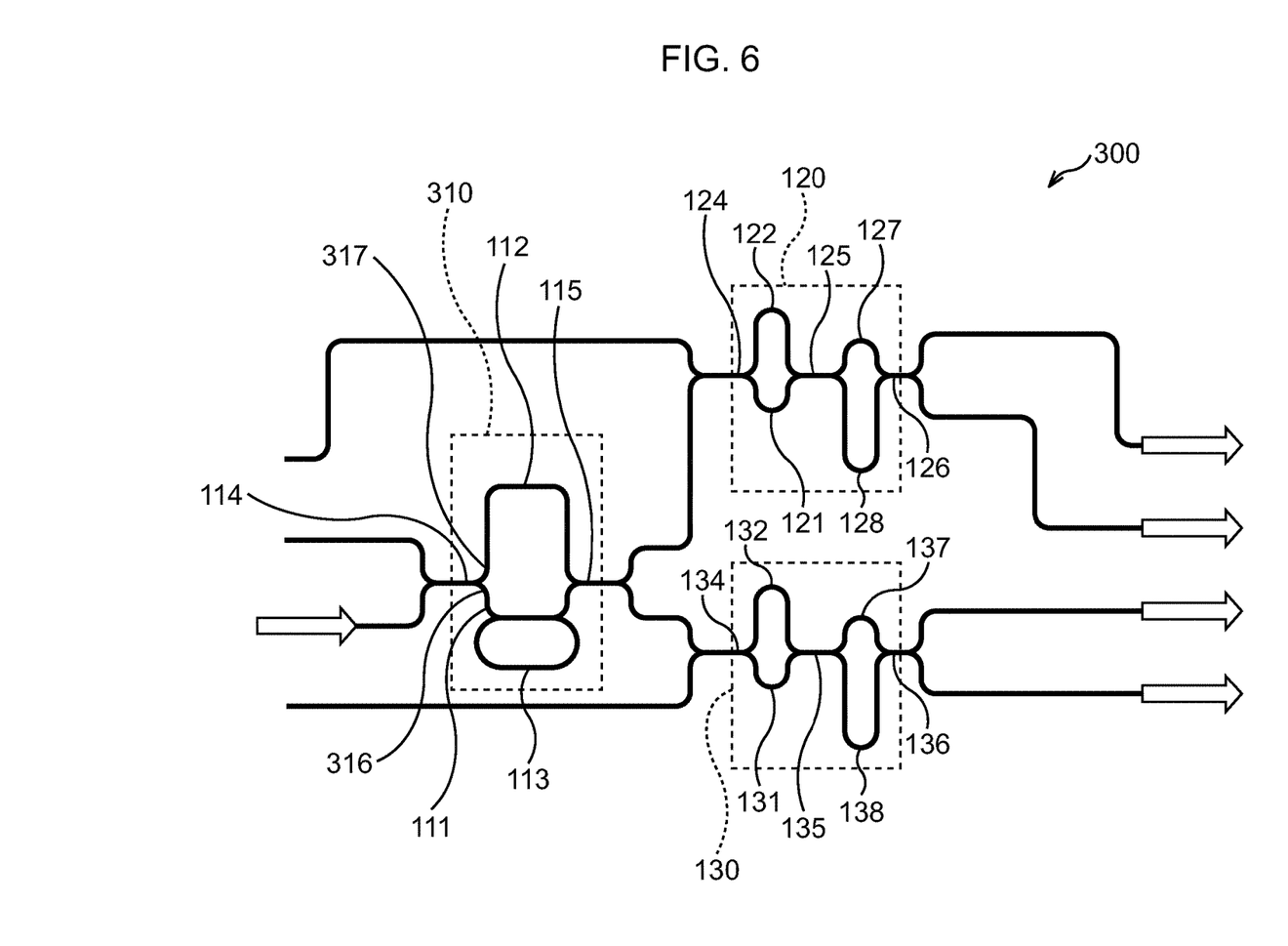
FIG. 6 is a diagram illustrating a structure of an optical element according to a third embodiment.

Next, a third embodiment will be described. The third embodiment is an example of a wavelength demultiplexer. FIG. 6 is a diagram illustrating a structure of an optical element according to the third embodiment.

In the third embodiment, the phase shifter 116 is not provided, a phase shifter 316 is included in the waveguide 111, and a phase shifter 317 is included in the waveguide 112, while the phase shifter 116 is included in the waveguide 111 in the first embodiment as described above. A length of the phase shifter 316 is 0.13 μm, and a length of the phase shifter 317 is −0.13 μm. The other structure is similar to that of the first embodiment.

In the third embodiment, since the phase shifter 317 is provided, the length of the waveguide 112 is shorter than that of the first embodiment by 0.13 μm, and the length of the waveguide 111 to which the phase shifter 316 is provided instead of the phase shifter 116 is shorter than that of the first embodiment by 0.13 μm. Therefore, similar to the first embodiment, the waveguide 112 is longer than the waveguide 111 by the length $\Delta L_{Total}$. Thus, an effect similar to that of the first embodiment can be obtained.

As is apparent from the second embodiment and the third embodiment, the phase shifter that suppresses the phase displacement caused by the loading of the ring waveguide may be provided to the waveguide to which the ring waveguide is coupled, to the other waveguide, or to both of the waveguides. The difference in the optical path lengths between the two waveguides generated due to the presence of the phase shifter, not the position at which the phase shifter is provided, is important.

FIG. 2, FIG. 5, and FIG. 6 illustrate the structures in which the optical element 100, the optical element 200, and the optical element 300 are respectively used as the wavelength demultiplexers, but, the optical element 100, the optical element 200, and the optical element 300 may be used as wavelength multiplexers.

Fourth Embodiment

Figure 7:
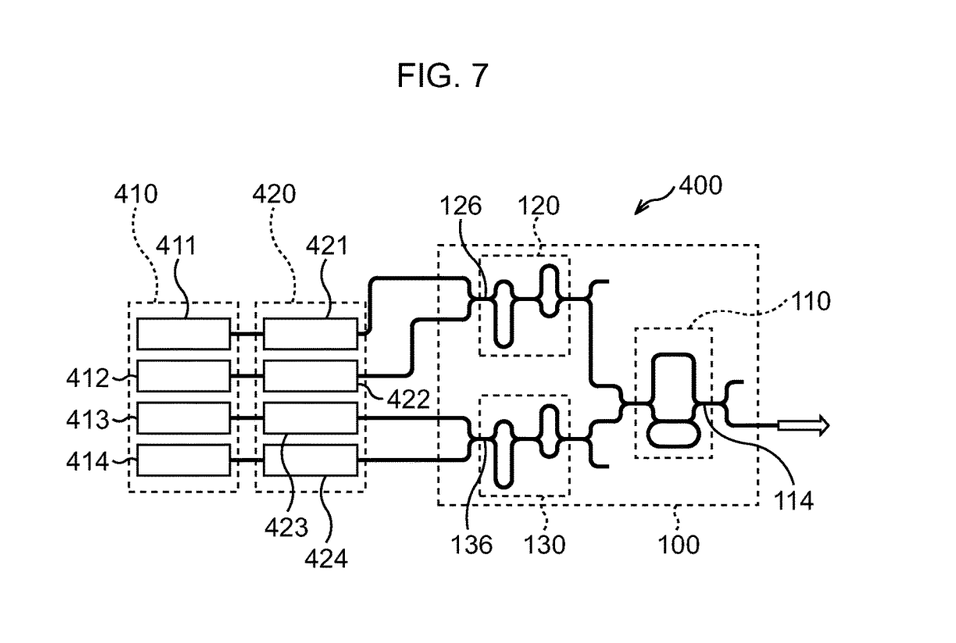
FIG. 7 is a diagram illustrating a structure of a light transmitting device according to a fourth embodiment.

Next, a fourth embodiment will be described. The fourth embodiment is an example of a light transmitting device. FIG. 7 is a diagram illustrating a structure of the light transmitting device according to the fourth embodiment.

As illustrated in FIG. 7, a light transmitting device 400 according to the fourth embodiment includes a light source unit 410, an optical modulator 420, and the optical element 100 according to the first embodiment. The light source unit 410 includes four lasers 411 to 414 whose oscillation wavelengths are different from one another, and the optical modulator 420 includes four Mach-Zehnder modulators 421 to 424. The lasers 411 to 414 emit continuous wave (CW) lights. The Mach-Zehnder modulators 421 to 424 modulate optical signals input therein. The Mach-Zehnder modulators 421 to 424 are connected to the lasers 411 to 414, respectively. The Mach-Zehnder modulators 421 and 422 are connected to the optical coupler 126, and the Mach-Zehnder modulators 423 and 424 are connected to the optical coupler 136.

In the light transmitting device 400, optical signals are individually modulated by the optical modulator 420. The optical element 100 functions as the wavelength multiplexer, in which the modulated optical signals input into the optical coupler 126 and the modulated optical signals input into the optical coupler 136 are multiplexed by the optical element 100, and the multiplexed optical signal is output from the optical coupler 114. Since the optical element 100 exhibits the excellent spectrum flatness, even if the wavelength displacement is generated in the optical signals input into the optical element 100, and even if an operating wavelength shift occurs in the optical element 100 due to a temperature fluctuation, a low-loss is maintained, and a light transmission of wavelength division multiplexed (WDM) signals can be performed.

Fifth Embodiment

Figure 8:
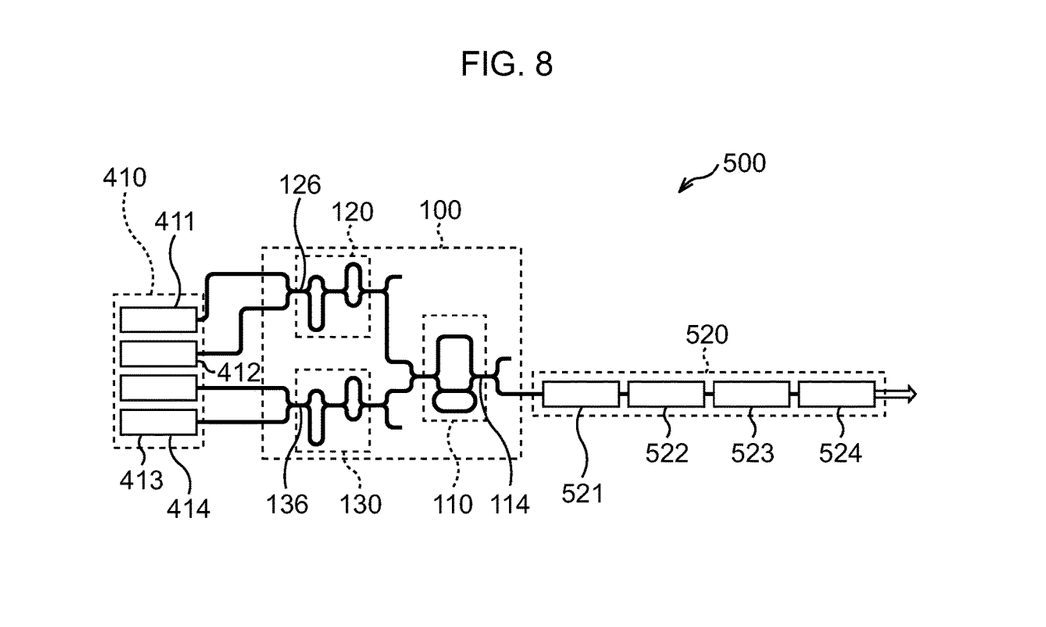
FIG. 8 is a diagram illustrating a structure of a light transmitting device according to a fifth embodiment.

Next, a fifth embodiment will be described. The fifth embodiment is an example of a light transmitting device. FIG. 8 is a diagram illustrating a structure of the light transmitting device according to the fifth embodiment.

As illustrated in FIG. 8, a light transmitting device 500 according to the fifth embodiment includes the light source unit 410, the optical element 100 according to the first embodiment, and an optical modulator 520. The lasers 411 and 412 are connected to the optical coupler 126, and the lasers 413 and 414 are connected to the optical coupler 136. The optical modulator 520 includes four ring modulators 521 to 524. The ring modulators 521 to 524 are connected in cascade to the optical coupler 114.

In the light transmitting device 500, the optical signals before modulation input into the optical coupler 126 and the optical signals before modulation input into the optical coupler 136 are multiplexed by the optical element 100, and the multiplexed optical signal is output from the optical coupler 114. The multiplexed optical signal is modulated by the optical modulator 520 in a collective manner. An effect similar to that of the light transmitting device 400 can be obtained by the light transmitting device 500.

Sixth Embodiment

Figure 9:
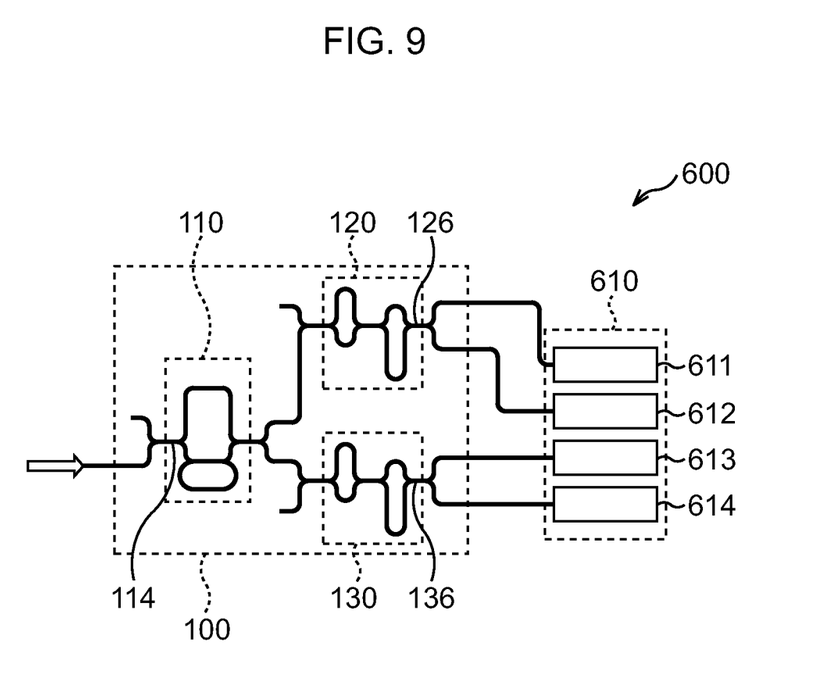
FIG. 9 is a diagram illustrating a structure of a light receiving device according to a sixth embodiment.

Next, a sixth embodiment will be described. The sixth embodiment is an example of a light receiving device. FIG. 9 is a diagram illustrating a structure of the light receiving device according to the sixth embodiment.

As illustrated in FIG. 9, a light receiving device 600 according to the sixth embodiment includes the optical element 100 according to the first embodiment, and a light receiver 610. The light receiver 610 includes four photodiodes 611 to 614. The photodiodes 611 and 612 are connected to the optical coupler 126, and the photodiodes 613 and 614 are connected to the optical coupler 136.

In the light receiving device 600, a wavelength division multiplexed optical signal (WDM signal) is input into the optical coupler 114, and demultiplexed, for each wavelength, into four types of optical signals by the optical element 100 to be output from the optical couplers 126 and 136. The optical signals of four wavelengths output from the optical couplers 126 and 136 are detected by the light receiver 610. Since the optical element 100 exhibits excellent spectrum flatness and low crosstalk performance, even if the wavelength displacement is generated in the optical signals input into the optical element 100, and even if the operating wavelength shift occurs in the optical element 100 due to the temperature fluctuation, the low-loss and the low crosstalk are maintained. Therefore, power penalty in an optical link can be suppressed when the light receiver 610 performs the detection.

The optical element 200 or 300 may be used instead of the optical element 100, in the fourth to sixth embodiments.

According to the above-described optical element and the like, since the lengths of the waveguides are appropriate, the spectrum with good flatness can be obtained through the simple control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical element, comprising:
   a first delayed interferometer; and
   a second delayed interferometer and a third delayed interferometer cascaded to the first delayed interferometer, wherein
   the first delayed interferometer comprises:
     a first optical coupler and a second optical coupler;
     a first waveguide between the first optical coupler and the second optical coupler;
     a second waveguide between the first optical coupler and the second optical coupler, the second waveguide being longer than the first waveguide; and
     a ring waveguide that is coupled to the first waveguide, and
   a difference between a length of the first waveguide and a length of the second waveguide differs from a difference in lengths corresponding to a channel spacing by a length corresponding to a phase displacement caused by loading of the ring waveguide.

2. The optical element according to claim 1, wherein
   each of the second delayed interferometer and the third delayed interferometer includes two delayed interferometers cascaded to each other, and
   delay amounts in the two delayed interferometers are respectively 0.5 times and 1 time of a delay amount in the first delayed interferometer.

3. The optical element according to claim 1, wherein a ring resonator of the first waveguide and the ring waveguide satisfies an antiresonance condition with respect to a transmission spectrum determined by the difference between the length of the first waveguide and the length of the second waveguide.

4. A light transmitting device, comprising:
   a light source unit that emits a plurality of lights with different wavelengths;
   a modulator that modulates the plurality of lights; and
   an optical element that multiplexes the plurality of lights, wherein
   the optical element comprises:
     a first delayed interferometer; and
     a second delayed interferometer and a third delayed interferometer cascaded to the first delayed interferometer,
   the first delayed interferometer comprises:
     a first optical coupler and a second optical coupler;
     a first waveguide between the first optical coupler and the second optical coupler;
     a second waveguide between the first optical coupler and the second optical coupler, the second waveguide being longer than the first waveguide; and
     a ring waveguide that is coupled to the first waveguide, and
   a difference between a length of the first waveguide and a length of the second waveguide differs from a difference in lengths corresponding to a channel spacing by a length corresponding to a phase displacement caused by loading of the ring waveguide.

5. The light transmitting device according to claim 4, wherein the optical element multiplexes lights that have been modulated by the modulator.

6. The light transmitting device according to claim 4, wherein the modulator modulates light that has been multiplexed by the optical element.

7. A light receiving device, comprising:
   an optical element that demultiplexes an optical signal to a plurality of lights with different wavelengths; and
   a light receiver that receives the plurality of lights output from the optical element, wherein
   the optical element comprises:
     a first delayed interferometer; and
     a second delayed interferometer and a third delayed interferometer cascaded to the first delayed interferometer,
   the first delayed interferometer comprises:
     a first optical coupler and a second optical coupler;
     a first waveguide between the first optical coupler and the second optical coupler;
     a second waveguide between the first optical coupler and the second optical coupler, the second waveguide being longer than the first waveguide; and
     a ring waveguide that is coupled to the first waveguide, and
   a difference between a length of the first waveguide and a length of the second waveguide differs from a difference in lengths corresponding to a channel spacing by a length corresponding to a phase displacement caused by loading of the ring waveguide.

* * * * *